Nov. 6, 1962 A. FERRARI ETAL 3,062,090
MOTION PICTURE REFLEX CAMERA
Filed July 6, 1959 2 Sheets-Sheet 1
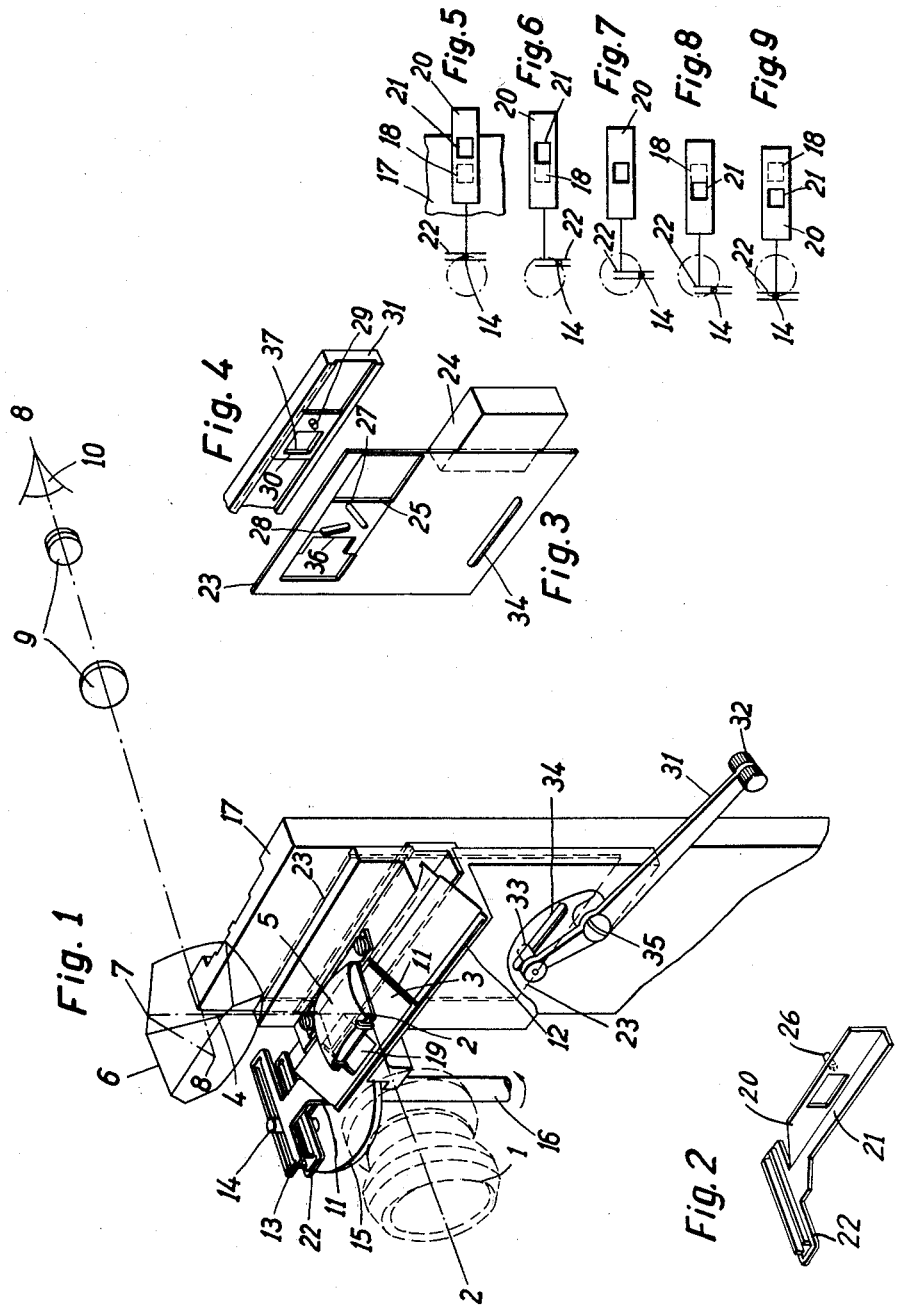
Inventors
Alfredo Ferrari
Adolf James

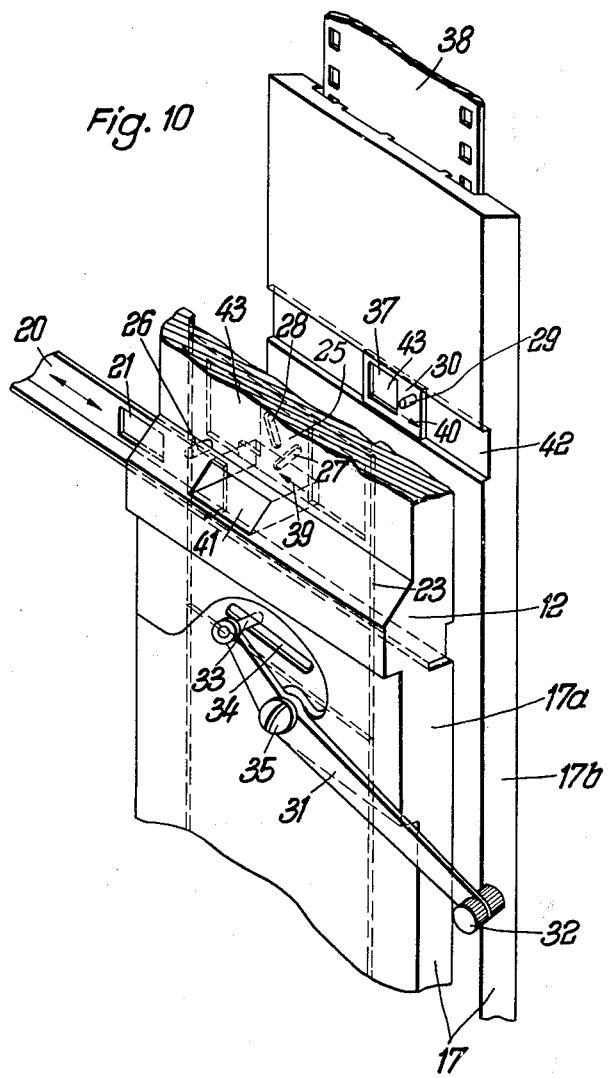

United States Patent Office 3,062,090
Patented Nov. 6, 1962

3,062,090
MOTION PICTURE REFLEX CAMERA
Alfredo Ferrari and Adolf Gasser, Mauren, Liechtenstein, assignors, by mesne assignments, to Contina Bureaux- und Rechenmaschinenfabrik Aktiengesellschaft Mausen, Furstentum, Liechtenstein
Filed July 6, 1959, Ser. No. 824,987
Claims priority, application Austria July 16, 1958
5 Claims. (Cl. 88—16)

Motion picture reflex cameras comprising a reciprocating carrier for the mirror, which carrier in one position causes the light rays from the lens to be reflected into the reflex viewfinder whereas in the other position of the mirror carrier the rays are passed to the focal plane, are already known but for various reasons have not been used in the manufacture of cameras, Due to the one-sided arrangement of the mirror with respect to the opening in the mirror carrier through which the rays from the lens are passed to the focal plane, each exposure position is followed by two phases in which the rays are deflected into the reflex viewfinder. This has the basic disadvantage that only every third phase is an exposure phase. When the speed is so selected that the frames of the exposed film merge as required in the eye of the viewer when the film is being shown, if the film feed movement is masked in the known manner, an unnecessary expenditure will be involved if the rays reflected into the reflex viewfinder enter the observing eye during two consecutive phases. This expenditure is not only undesired, but detrimental because it means that the mirror carrier must reciprocate at an unnecessarily high frequency. The mirror being a relatively heavy reciprocating part, inertial forces will occur which are very high owing to the square relation between velocity and mass forces. In addition to the danger of the occurrence of resonant positions or at least of the passing through resonant ranges, an undersirable vibration of the camera will occur whereby the accuracy of photographing is adversely affected. Another disadvantage of the known device resides in that in addition to the mirror carrier, two separately driven plates are required to enable the mirror to assume its exposure and viewfinding positions in the required sequence. Each plate moves according to a separate function and for this reason requires a separate drive. As a result, the structural expenditure involved in the reflex observation of pictures to be made by motion picture cameras is so considerable that structures of this kind have not been used in practice.

Based on reflex cameras comprising a reciprocating carrier of the mirror, which carrier in one position causes the light rays from the lens to be reflected into the reflex viewfinder whereas in another position of the mirror carrier the rays are passed to the focal plane, the invention has as its object to avoid the disadvantages of the known camera design by arranging mirror surfaces on both sides of the opening of the mirror carrier which serves for passing the rays from the lens to the focal plane.

The arrangement according to the invention eliminates the disadvantages of the known device. Each deflection of the rays into the reflex viewfinder during one phase of the mirror movement is followed by another phase in which the rays are passed to the focal plane so that the frequency of reciprocation need be only one half that of the former arrangement. As a result, the inertial forces are reduced to one fourth of the inertial forces which occur in the former arrangement so that the camera operates much more smoothly than with the former arrangement. Moreover, the design of the shutter plates becomes very simple and all plates can be controlled according to the same function so that simple driving conditions are obtained.

In order to provide such a camera with a shutter diaphragm which becomes also effective when the shutter is formed by reciprocating plates, a development of the invention resides in that a shutter diaphragm of variable light-transmitting cross-section is disposed in the path of rays behind a shutter part which has an invariable light-transmitting cross-section and which reciprocates at different speeds depending on the speed setting of the transmission, said shutter diaphragm reciprocating in synchronism with this shutter part. For this purpose the plate which forms the reciprocating shutter part and is moved by means of the transmission of the camera has plate and leaf slides associated with it which are not directly driven. To guide the plate slide, a guide plate is provided, which is movable at right angles to the optical axis of the image-forming optical system and at right angles to the direction of reciprocation of the shutter plate. A pin on the driven shutter plate engages an oblique slot in the plate slide to cause the latter to participate in the reciprocation of the shutter plate. In addition, a leaf slide is provided, wihch carries also a pinlike projection, which engages a second oblique slot in the plate slide, the inclination of the second slot being opposite to the inclination of the first slot in the plate slide. This results in a compact arrangement because the directly driven shutter plate engages one surface of the guide plate whereas the leaf slide engages the other. The guide plate, the plate slide and the leaf slide are suitably disposed between the elements of a composite film guide.

The drawing illustrates by way of example a possible design of those parts which are essential for the invention in a motion picture camera which permits the subject to be viewed in a viewfinder, whereas the unessential parts known per se have not been shown. Specifically, FIG. 1 is a diagrammatic perspective view of one embodiment using, e.g., a reciprocating mirror carrier, whereas FIGS. 2–4 show parts of FIG. 1.

FIGS. 5–9 show the mode of operation of the part shown in FIG. 2 in different positions relative to the exposing aperture in the film guide.

FIG. 10 shows the parts separately represented in FIGS. 1 to 4 immediately before their assembly.

In FIG. 1, 1 represents with dotted lines the lens of the camera having the optical axis 2—2. In order to view the subject to be photographed in a viewfinder, a mirror 3 is provided, to deflect the rays directed along the optical axis 2—2 in the direction 4, the ground glass 5 lying in the deflected beam of rays. Also in the path of the light rays, indicated by the light ray 4, the five-sided roof-shaped prism 6 is disposed, which causes a further deflection at points 7 and 8. The subject to be photographed is visible to the eye 10 of the viewer through the eyepiece 9 when one side of the mirror 3 is in the position shown in FIGS. 1 and 9. A second mirror reflection on the other side of mirror 3 is effected in the position of FIG. 5.

The position of the sides of the mirror 3 is variable. The mirror 3 is arranged on the mirror carrier 11 or the mirror carrier 11 may form the mirror 3. The mirror carrier 11 is movably guided in a straight guide 12 and driven by a crank and slide arrangement. For this purpose the carrier 11 is provided with the guide slot 13, in which the crankpin 14 of a crank and slide arrangement 15 is guided. The crank disc is mounted on the shaft 16, which has a drive consisting generally of a spring drive, electric motor or the like. The shaft 16 may also serve to drive the claws for feeding the film. The film 38, shown in FIG. 10, is moved in the film guide 17, which forms an exposing aperture, which is not shown in FIG. 1 and is indicated at 18 in FIG. 5 and through which the film is exposed when the parts arranged in the path of rays before the exposing aperture 19 are in exposure position. These parts include, first, the mirror carrier 11 and mirror 3, which are formed with aligned cutouts forming the opening 19, which in the exposure position lies in the optical axis 2—2 of the lens 1 whereas the side mirror surfaces lie on both sides of the opening 19. Arranged for synchronous movement with the mirror carrier 11 is a shutter plate 20, which is not shown in FIG. 1 but shown in perspective in FIG. 2. The window-like opening 21 of this plate is also disposed in the optical axis 2—2 of the lens in exposure position. For this purpose the shutter plate 20 is also driven by a crank and slide arrangement. The plate 20 has a guide slot 22, which receives the crankpin 14, which serves also to drive the mirror carrier 11.

Parts 17 and 20 form a primary focal plate shutter, the mode of operation of which is apparent from FIGS. 5 to 9. In FIG. 5 the plate 20 has reached one end position, in which the exposing aperture 18 in the film guide 17 is entirely closed so that no exposure occurs. The exposure begins in the position of the parts shown in FIG. 6. The fully opened shutter is shown in FIG. 7. In FIG. 8 the exposing aperture 18 is again closed and in FIG. 9 the plate 20 has reached the end position opposite to FIG. 5. Thus the film 38 is exposed in FIG. 7 whereas in FIGS. 5 and 9 the object is shown in the reflex viewfinder 3, 5, 6, 9 at 10. In FIG. 7 the drive pin 14 is in the lower position and in the next exposure position it is in the upper position so that the shaft 16 is turned through 180° between exposure positions.

In order to form an auxiliary focal plane shutter of variable slit width which moves periodically in synchronism with the mirror carrier 11 and the shutter plate 20, the following additional parts are provided, which are separately shown in FIGS. 3 and 4 but are also present in FIG. 1 although they are not shown therein. The guide plate 23, which is vertically guided in part 24, extends beside the shutter plate 20. Part 24 may form a part of the film guide 17 (see FIG. 10). The guide plate 23 guides the plate slide 25 in the same direction in which the plate 20 is arranged to reciprocate. As contrasted with the directly driven shutter plate 20, however, the plate slide 25 is only indirectly driven by a pin 26 of the plate 20 engaging the oblique slot 27 of the plate slide 25. The plate slide 25 has a second oblique slot 28, the inclination of which is opposite to that of the oblique slot 27. The oblique slot 28 is engaged by the pin 29 of the leaf slide 30, which has also no drive and is guided in part 31 in the direction in which the shutter plate 20 is movable. Besides, the guide plate 23 is arranged to be lifted and lowered in that an adjusting member 31 having a handle 32 carries a pin 33 engaging a slot 34 in the guide plate 23. The adjusting member 31 is rotatably mounted at 35.

The mode of operation of the parts thus described is readily apparent from what has been said hereinbefore. In the exposure position of the mirror carrier 11 and the parts forming the focal plane shutter the exposing apertures 18, 19 and 21 lie in the optical axis 2—2 so that the film is exposed, provided that the guide plate 23 has been set by the adjusting member 31 to a level in which the oblique slots 27, 28 impart to the plate and leaf slides 25 and 30 a relative position in which the edges 36, 37 of these slides are spaced apart in the direction of movement of plate 20 by a distance which is equal to the distance between the limiting edges of the exposing apertures 18 and 21 measured in the same direction. When this applies to the assumed level of the guide plate 23, it will be varied by raising or lowering the guide plate 23. An adjustment in one direction will cause the edges 36, 37 of the slides 25, 30 to approach each other and finally to overlap so that the shutter diaphragm has been set to zero. In the other direction said edges move apart until their distance has the value defined hereinbefore so that the shutter diaphragm has been fully opened. Nevertheless the plate and leaf slides 25, 30 continually participate in the reciprocating movement of the shutter plate 20 owing to their coupling to the shutter plate 20 at 26 so that the shutter diaphragm can be adjusted by means of the plate 23 without interfering with this reciprocation.

In practical constructions the handle 32 is replaced by an eccentric mechanism, the adjusting member of which has a scale associated with it, on which the variation in exposure time resulting from the setting of the shutter diaphragm is stated for the different speeds (transmission ratio of transmission). For instance, for speed 8 it is stated that the variation of the shutter diaphragm corresponds to exposure times from $1/_{18}$ to $1/_{140}$ second whereas the exposure time may be reduced at speed 64, e.g., to $1/_{120}$ second, which is also noted on the scale.

In FIG. 10 the mirror carrier 11 has not been shown so that the parts lying behind it become visible. It is apparent that the straight guide 12 is formed with a passage 41, through which the light can fall into the exposing aperture 21 of the shutter plate 20 when the apertures 21 and the passage 41 are in alignment. Further, the part 17a of the film guide 17 is apparent, which comprises the additional part 17b. When the guide plate 23 guided in part 17a is moved upwardly the edge 36 of the plate slide 25 is displaced relative to the shutter plate 20 in the direction of arrow 39 to the left and the edge 37 of the leaf slide 30 is displaced relative to the driving shutter plate 20 in the direction of arrow 40 to the right. As a result, the shutter diaphragm opening 43 between the edges 36, 37 is reduced as far as to zero independently of the reciprocating movement performed by the shutter plate 20 and the plate and leaf slides 25, 30. The shutter diaphragm opening 43 is enlarged to its maximum value, which corresponds to the exposing aperture 21, if the guide plate 23 is lowered. A recess 42 in part 17b of the film guide 17 serves for guiding the leaf slide 30.

What is claimed is:
1. A motion picture camera comprising in combination, an optical system, a guide for bringing light-sensitive film to a position where the plane of the film is at right angles to the optical axis of said optical system, said film guide being formed with an exposure aperture for transmitting rays of said optical system to said plane of the film, mirror surfaces, a carrier fixedly carrying said mirror surfaces, support means supporting said carrier for movement to positions in which the mirror surfaces either intersect the optical axis to deflect rays or remain outside of the path of said rays, drive means operatively connected to said mirror carrier for moving said mirror surfaces periodically to the position in which they reflect the rays of the optical system and out of the latter position, said carrier being formed with an opening through which rays of the optical system pass to said exposure aperture, each of said mirror surfaces being disposed beside said opening in said carrier, an optical viewfinder system arrangement in the path of rays of said optical system deflected by said mirror surfaces, said optical viewfinder system periodically providing an image of the subject in accordance with the deflection of rays by said mirror surfaces into the viewfinder system, said drive means providing a frequency of periodic movement of the mirror surfaces sufficient to cause the images seen through the viewfinder system to merge, a primary focal plane shutter plate operatively connected to said carrier for movement therewith slidably engaging said guide, and formed with an opening aligned with said opening of said mirror carrier so that an exposure is made when said mirror carrier and shutter plate openings are aligned with said exposure aperture of said film guide, an auxiliary focal plane shutter of variable slit width operatively connected to said shutter plate for movement in synchronism with the movement of the plate and mirror carrier, said auxiliary shutter comprising a guide plate, means for adjusting the guide plate in a direction at right angles to the optical axis of the optical system and parallel to the film guide, a plate slide in said guide plate, adjusting means for adjusting the plate slide in a direction at right angles to the optical axis and parallel to the movement of the mirror carrier, said adjusting means consisting of a pinlike projection of the shutter plate and an oblique slot in the plate slide receiving said pinlike projection, said plate slide having a second oblique slot, the direction of said oblique slot being opposite to the direction of the first slot, the limiting edge of said plate slide forming one side edge of the shutter diaphragm opening, a leaf slide, a limiting edge of said leaf slide forming the other side edge of the shutter diaphragm opening, said leaf slide being movable in the direction at right angles to the optical axis of the optical system and parallel to the direction of movement of the mirror carrier, a pinlike projection of said leaf slide, received in the second oblique slot of the plate slide, the vertical movement of said guide plate being adapted to effect a stepless variation of the shutter diaphragm opening formed between the plate slide and leaf slide during a reciprocating movement of the mirror carrier, shutter plate, plate slide and leaf slide.

2. A camera as set forth in claim 1, said shutter plate engaging one side and the leaf slide engaging the other side of the guide plate.

3. A camera as set forth in claim 1, said film guide being of composite construction and the shutter plate and the plate slide and leaf slide being disposed between the parts of said film guide.

4. In a motion picture camera, in combination, a stationary film guide formed with an exposure aperture; a primary focal plane shutter plate slidably engaging said film guide and also formed with an aperture; support means supporting said shutter plate for reciprocating movement along said guide to and from a position where said aperture of said shutter plate is aligned with said exposure aperture; drive means operatively connected to said shutter plate for reciprocating the same; and an auxiliary focal plane shutter of variable slit width operatively connected to said shutter plate for movement therewith, said auxiliary shutter comprising a guide plate, means operatively engaging said guide plate for adjusting the same in a direction at right angles to the optical axis passing through said exposure aperture and parallel to said film guide, a plate slide in said guide plate, adjusting means operatively engaging said plate slide for adjusting the same in a direction at right angles to the optical axis as well as at right angles to the direction of movement of said guide plate, said plate slide having a limiting edge forming one side edge of the opening of said auxiliary shutter, a leaf slide having a limiting edge forming the other side edge of the opening of said auxiliary shutter, means supporting said leaf slide for movement in the same direction as said plate slide, and second adjusting means cooperating with said plate and leaf slides for moving the same and said limiting edges thereof relative to each other for varying the opening of said auxiliary shutter, upon movement of said plate slide with said guide plate in said direction parallel to the film guide, whereby movement of said guide plate will provide a variation in the opening of said auxiliary shutter during movement of said plate and leaf slides with said primary focal plane shutter plate.

5. In a camera as recited in claim 4, both of said adjusting means including pin-and-slot connections wherein the slot is inclined with respect to the direction of movement of the members which are adjusted.

References Cited in the file of this patent

UNITED STATES PATENTS

| | | |
|---|---|---|
| 2,029,418 | Friedland | Feb. 4, 1936 |
| 2,343,015 | Lewis | Feb. 29, 1944 |

FOREIGN PATENTS

| | | |
|---|---|---|
| 592,537 | Great Britain | Sept. 22, 1947 |
| 606,689 | Great Britain | Aug. 18, 1948 |
| 736,214 | Great Britain | Sept. 7, 1955 |
| 558,330 | France | May 23, 1923 |
| 927,448 | France | May 5, 1947 |